US010987612B2

(12) United States Patent
Leblanc et al.

(10) Patent No.: US 10,987,612 B2
(45) Date of Patent: Apr. 27, 2021

(54) AIRBORNE MOLECULAR CONTAMINATION FILTER CARTRIDGE SYSTEM WITH COMBUSTIBLE FILTER CARTRIDGE AND REUSABLE FRAME

(71) Applicant: ENTEGRIS, Inc., Billerica, MA (US)

(72) Inventors: Tom Leblanc, Mendon, MA (US); Joe Wildgoose, North Smithfield, RI (US); Marc Venet, Natick, MA (US); Evan Warniers, Acton, MA (US); John Gaudreau, Chepachet, RI (US)

(73) Assignee: ENTEGRIS, INC., Billerica, MA (US)

( * ) Notice: Subject to any disclaimer, the term of this patent is extended or adjusted under 35 U.S.C. 154(b) by 184 days.

(21) Appl. No.: 16/097,037

(22) PCT Filed: Apr. 28, 2017

(86) PCT No.: PCT/US2017/030009
§ 371 (c)(1),
(2) Date: Oct. 26, 2018

(87) PCT Pub. No.: WO2017/189940
PCT Pub. Date: Nov. 2, 2017

(65) Prior Publication Data
US 2019/0291027 A1 Sep. 26, 2019

Related U.S. Application Data

(60) Provisional application No. 62/328,920, filed on Apr. 28, 2016.

(51) Int. Cl.
*B01D 46/00* (2006.01)
*B01D 46/52* (2006.01)
(Continued)

(52) U.S. Cl.
CPC ............ *B01D 27/06* (2013.01); *B01D 27/08* (2013.01); *B01D 46/0005* (2013.01);
(Continued)

(58) Field of Classification Search
CPC ............ B01D 46/0005; B01D 46/0026; B01D 46/0036; B01D 46/10; B01D 46/521;
(Continued)

(56) References Cited

U.S. PATENT DOCUMENTS 5,622,543 A 4/1997 Yang
5,772,738 A 6/1998 Muraoka
(Continued)

FOREIGN PATENT DOCUMENTS

CN 1568217 A 1/2005
CN 202355962 U 8/2012
(Continued)

OTHER PUBLICATIONS

Machine-generated English translation of JP 2004-051037 A, published Feb. 2004.*

*Primary Examiner* — Frank M Lawrence, Jr.
(74) *Attorney, Agent, or Firm* — Entegris, Inc.

(57) ABSTRACT

Filters for semiconductor tool and clean room applications to control airborne molecular contamination. The filter cartridge system includes a filter cartridge having a non-woven fiber and at least one adsorbent. In some embodiments, the filter cartridge is constructed of substantially combustible materials to support its end of service destruction.

12 Claims, 10 Drawing Sheets

(51) Int. Cl.
  *B01D 27/06* (2006.01)
  *B01D 46/10* (2006.01)
  *B01D 27/08* (2006.01)

(52) U.S. Cl.
  CPC ..... *B01D 46/0026* (2013.01); *B01D 46/0036* (2013.01); *B01D 46/10* (2013.01); *B01D 46/521* (2013.01); B01D 2265/04 (2013.01); B01D 2279/51 (2013.01)

(58) Field of Classification Search
  CPC ........ B01D 27/06; B01D 27/00; B01D 27/04; B01D 27/08; B01D 53/04; B01D 2265/04; B01D 2279/51; B01D 2259/0216; B01J 20/28028
  USPC ............................ 96/134, 135, 147, 153, 154
  See application file for complete search history.

(56) References Cited

U.S. PATENT DOCUMENTS

| | | | |
|---|---|---|---|
| 6,146,451 A | 11/2000 | Sakata | |
| 6,740,147 B2 | 5/2004 | Kishkovich | |
| 7,322,791 B2 | 1/2008 | Stilgenbauer | |
| 7,377,963 B2 | 5/2008 | Tanahashi | |
| 8,491,691 B2* | 7/2013 | Raether | B01D 46/526 55/502 |
| 8,741,139 B2* | 6/2014 | LaCroix | B01D 29/21 210/232 |
| 8,956,433 B2 | 2/2015 | Sundvik | |
| 8,968,445 B2 | 3/2015 | Lindahl | |
| 2001/0032545 A1* | 10/2001 | Goto | B01D 46/0001 96/134 |
| 2002/0104793 A1* | 8/2002 | Ohtani | B01D 61/18 210/321.6 |
| 2007/0180803 A1 | 8/2007 | Sundet | |
| 2012/0067215 A1 | 3/2012 | Lindahl | |
| 2012/0272829 A1* | 11/2012 | Fox | B01J 20/28011 96/154 |
| 2012/0324848 A1* | 12/2012 | Enbom | B01D 46/521 55/483 |
| 2013/0000489 A1 | 1/2013 | Lu | |

FOREIGN PATENT DOCUMENTS

| | | |
|---|---|---|
| CN | 103648610 A | 3/2014 |
| CN | 205095574 U | 3/2016 |
| DE | 102004045340 B4 | 8/2013 |
| JP | 26803862 A | 6/1990 |
| JP | 30262262 A | 3/1992 |
| JP | H08266831 A | 10/1996 |
| JP | 10272321 A | 10/1998 |
| JP | H10328517 A | 12/1998 |
| JP | 11155650 A | 6/1999 |
| JP | 11182499 A | 7/1999 |
| JP | 2000061232 A | 2/2000 |
| JP | 2000157810 A | 6/2000 |
| JP | 2000189736 A | 7/2000 |
| JP | 2001219018 A | 8/2001 |
| JP | 2003175308 A5 | 6/2003 |
| JP | 2003320209 A | 11/2003 |
| JP | 2004051037 A | 2/2004 |
| JP | 2004089982 A | 3/2004 |
| JP | 2005320715 A | 11/2005 |
| JP | 2006075805 A | 3/2006 |
| JP | 2008212780 A | 9/2008 |
| TW | 201119727 A | 6/2011 |
| TW | 201343234 A | 11/2013 |
| TW | 201611881 | 4/2016 |
| WO | 2010072333 A1 | 7/2010 |

* cited by examiner

AIRBORNE MOLECULAR CONTAMINATION FILTER CARTRIDGE SYSTEM WITH COMBUSTIBLE FILTER CARTRIDGE AND REUSABLE FRAME

CROSS REFERENCE TO RELATED APPLICATIONS

This application is filed under the provisions of 35 U.S.C. §371 claiming priority of International Patent Application No. PCT/US2017/030009 filed on Apr. 28, 2017, which further claims the benefit of U.S. Provisional Application No. 62/328,920, which was filed on Apr. 28, 2016, the content of which is herein incorporated by reference in its entirety.

BACKGROUND

Many semiconductor tools and clean rooms are situated in locations, such as in particular Taiwan, in which landfill space and disposal of manufacturing equipment is expensive. Because the available landfill space is very limited, the Taiwan Environmental Protection Agency (EPA) has adopted a strategy favoring combustion as the primary method of municipal solid waste treatment to be complemented by land-filling. Therefore, starting from 1991, the Taiwan government set up a long term plan for the construction of WTE (Waste to Entergy) plants. According to the Engineering Project for the Construction of WTE plants in Taiwan, 21 WTE plants were to be constructed by the government by 2005.

Plastic has a very high heat value, and therefore it is very wasteful to bury it in landfill. However, in general, Airborne Molecular Contamination (AMC) filters used in semiconductor tool and clean room applications are typically constructed of absorbing media permanently bonded to metal housings, which makes it difficult to dispose of recycle or reuse such filters. Conventionally, labor is expended in separating the metal cases of such filters from the glued-in filter media.

Some filter designs attempt to address the need for re-usability by using loose granular adsorbent, which is re-used by pouring the granular adsorbent out of a re-used metal housing and pouring in fresh adsorbent. Other attempts have been to regenerate filter media.

There is, however, an ongoing need to address concerns and reduce costs involved in the disposal of AMC filters for semiconductor tools and clean room applications.

SUMMARY

The present disclosure is directed to filters suitable for use in semiconductor tool and clean room applications to control airborne molecular contamination (AMC). The filter cartridge system includes a filter cartridge having a non-woven fiber and at least one adsorbent. In some embodiments, the filter cartridge is constructed of substantially combustible materials to support its end of service destruction.

The substantially combustible filter cartridge is placed into a reusable case to complete the filter cartridge system. Non-limiting factors considered in designing the reusable case include weight, durability, shape retention, handling, and flame resistance, among others. In one embodiment, the also reusable case for the filter cartridge is metal. In application and use, the filter cartridge is readily separable from the reusable case for disposal.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

DETAILED DESCRIPTION

A description of example embodiments of the invention follows.

Conventional filters for molecular contaminants used in semiconductor tool and clean room applications are usually constructed of adsorbing media bonded to metal housings. This makes recycling the metal and plastic media expensive or impossible. Also, the cost of the filter is high because the metal housing is not reused.

In accordance with a version of the invention, there is provided an AMC filter made out of substantially combustible materials, which is used in conjunction with a reusable housing, and preferably a metal housing. Such a filter system provides the advantage, for example, of permitting disposal of the substantially combustible filter by incineration, while the metal housing can be reused. Further advantages can include, for example, that the filter system can reduce the cost of ownership, reduce the number of parts needed in filter assembly, reduce the labor involved in disposal and reduce environmental impact.

Figure 1:
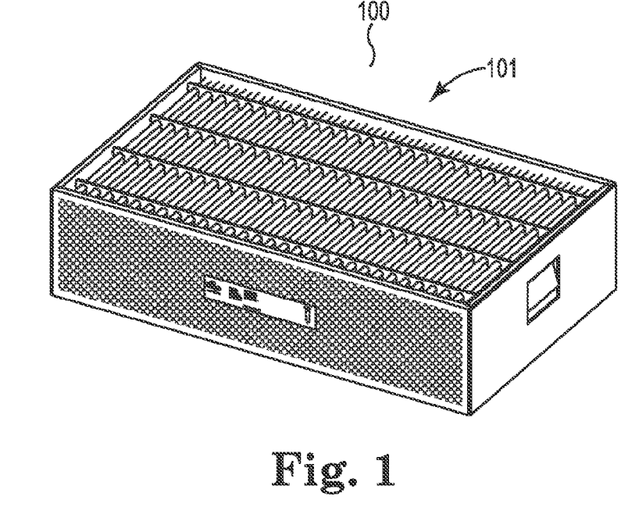
FIG. 1 is a perspective view of an embodiment of this disclosure.
Figure 2:
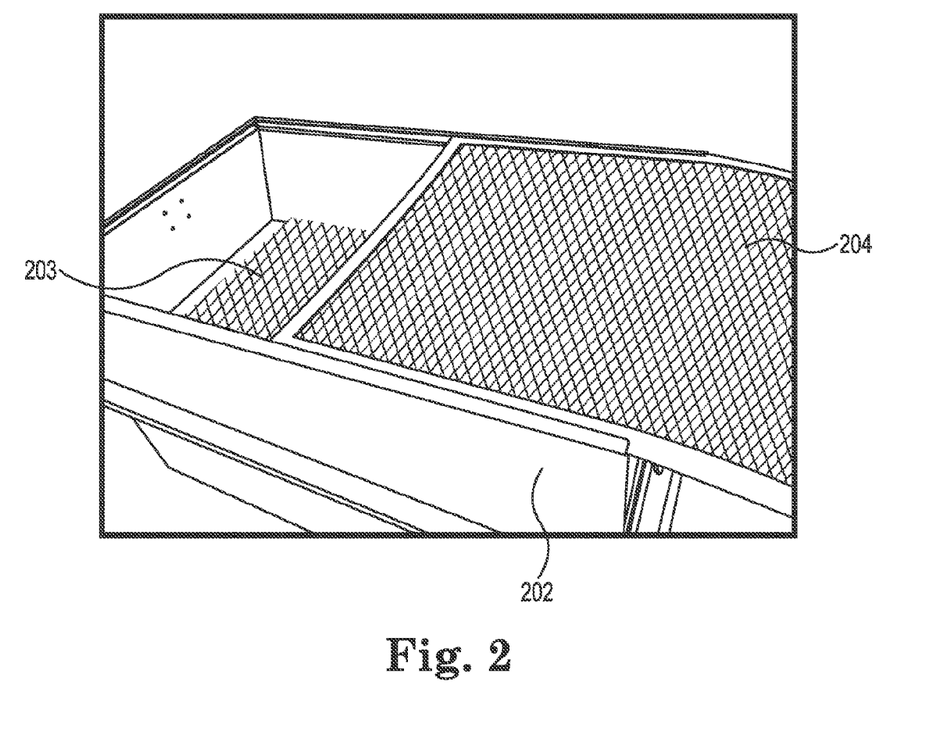
FIG. 2 is a diagram of one embodiment of a metal frame.

FIG. 1 is a diagram of a filter cartridge system 100 in accordance with a version of the invention, which provides a disposable filter cartridge 101 that can fit into a reusable metal frame 202 (shown in FIG. 2).

FIG. 2 is a diagram showing a reusable metal frame 202 with which a disposable filter cartridge 101 (see FIG. 1) may be used, in accordance with a version of the invention. FIG. 2 shows placement of a bottom metal screen 203, which can be used beneath the filter pleat pack, inside the metal frame 202, in accordance with a version of the invention. A top metal screen 204 may also be used, above the filter pleat pack, and may slide as shown in FIG. 2 into the top of the metal frame 202. The metal screens 203, 204 of FIG. 2 may include a thin layer of scrim material on the metal screens, and may include closed-cell polyethylene foam around the edges of the screens. The metal frame 202 may for example meet semiconductor manufacturing specifications, and may for example comprise an anodized aluminum frame. In another version according to the invention, the filter cartridge 101 may be secured into the metal frame 202 using clamps, such as toggle clamps, which can be used in conjunction with matching indents in a glue bed of the filter cartridge 101.

Figure 3:
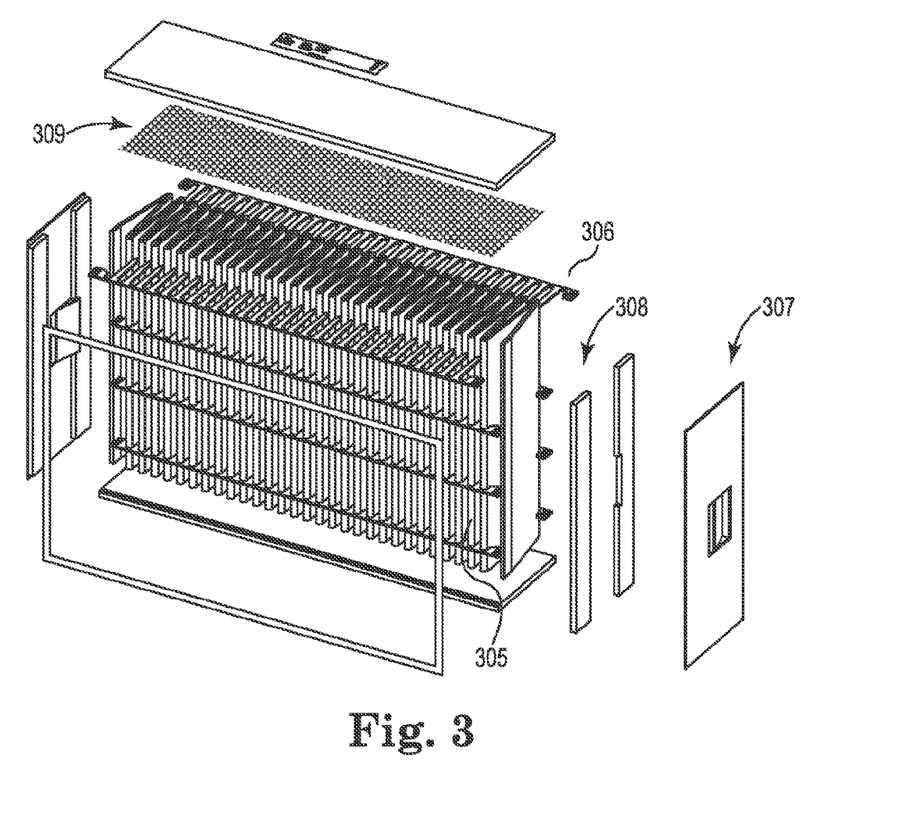
FIG. 3 is an exploded view of one embodiment of a filter cartridge.

FIG. 3 is an exploded view diagram of a filter cartridge system in accordance with a version of the invention. The filter cartridge system includes a filter pleat pack 305, filter pleat comb separators 306, side panels 307, hot melt glue 308 and a screen 309. The filter pleat comb separators 306 can be made, for example, of a plastic such as laser-cut polypropylene.

Figure 4:
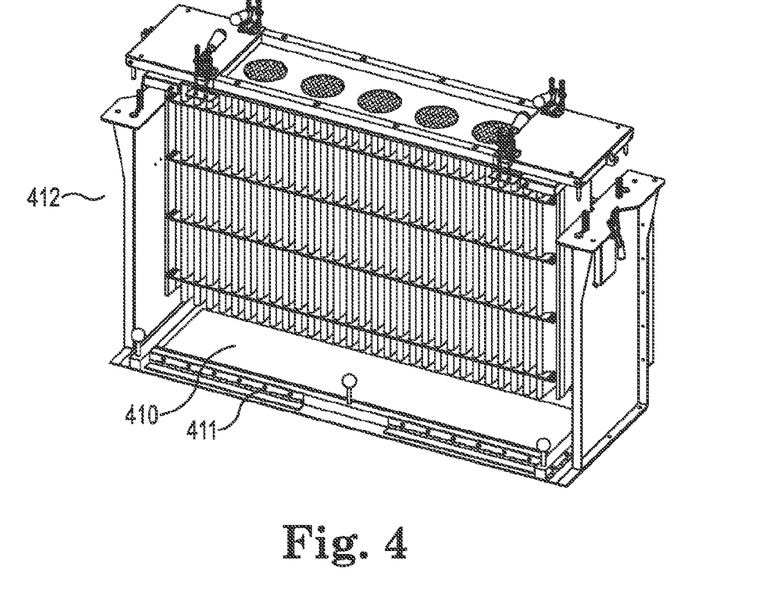
FIG. 4 is a diagram demonstrating the potting of a filter cartridge.

FIG. 4 is a diagram illustrating a process for potting (or casting) a filter cartridge in accordance with a version of the invention. The filter is potted in a mold with no extra components, relying on the glue bed itself for structure. The mold uses a PTFE coated aluminum sheet 410 as the base, which can include hinges 411 to assist with removal of the filter from the mold after curing. The PTFE coating produces a smooth surface and makes the mold durable. An alignment fixture 412 is also used, which suspends the filter pleat pack in space so that it fits into the ultimate shape, and ensures that the filter is square when potted on the other side. In accordance with one version of the invention, the potting material may be Hot Melt Polyethylene (HMGE), such as nitrogen-foamed polyethylene, although other types of hot melt glue may be used. The glue is poured into a pan lined, for example, with Teflon-reinforced fiberglass cloth and steel bars. When the glue cools and hardens, the filter is pealed out of the mold.

Figure 5A:
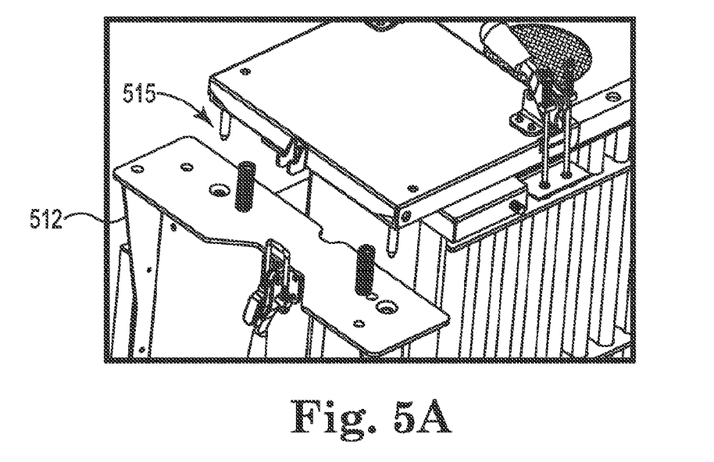
FIGS. 5A and 5B are partial views of an alignment fixture.
Figure 5B:
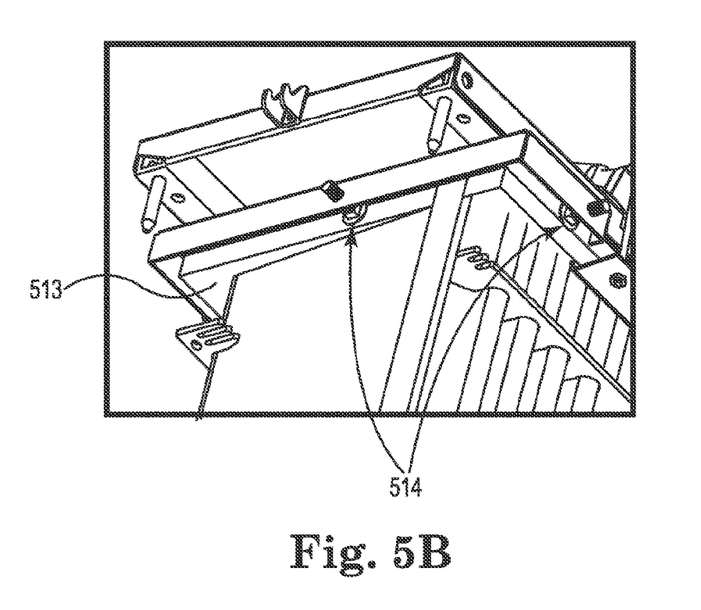

FIGS. 5A and 5B are diagrams illustrating use of an alignment fixture 512 in potting (or casting) a filter cartridge in accordance with a version of the invention. The glue bed 513 from potting the first side is aligned with locator pins 514 in the frame. The frame is then aligned with the jig using locator pins 515.

Figure 6:
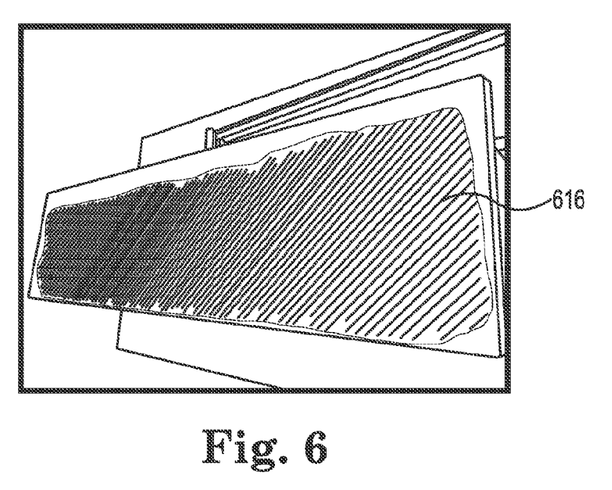
FIG. 6 is a diagram of one embodiment of a screen.

In accordance with a version of the invention, a membrane, such as a screen 616 (see FIG. 6), is used to separate the filter pleat pack from the outside of the mold. The main goals are to disguise the exposed carbon of the filter pleat pack for aesthetic purposes; to contain any carbon that may have breached the potting bed; and to assist with meeting flammability requirements. FIG. 6 is a diagram of a screen 616 used as such a membrane in accordance with a version of the invention. The screen 616 offsets the exposed carbon of the filter pleat pack from the edge of the cartridge, and disguises the pleat pack. A screen mesh opening size of, for example, less than about 0.64 cm, such as about 0.56 cm, and a screen thickness of less than about 0.32 cm, may be used. To affix the screen 616 to the filter pleat pack, pushing the screen through the glue with the pleat pack, after the glue has been poured, may be used, with results as shown in FIG. 6.

In accordance with a version of the invention, edge sealing of the filter pleat pack media may be used, for example edge sealing of scrim materials on the pleat edges of the pleat pack. This permits retaining of the carbon in the filter media where no particle screen barriers are used on the filter pleat pack. The pleat pack may include one or more layers of scrim, surrounding one or more layers of high loft. Both the scrim and the high loft may include non-woven materials, such as polyester fibers, and a binder. The high loft material may include an adsorbent, such as a carbon or ion exchange adsorbent, and may include mixed adsorbents. As used herein, "edge sealing" of the filter pleat pack media comprises sealing the pleat edges of a non-woven fiber material. Such "edge sealing" differs from the "four-sided seal" referred to herein and below, which latter term refers to an air seal around the filter pleat pack, for example formed using a single component hot melt material.

As used herein, "substantially combustible materials" can, for example, include greater than about 90% by weight of combustible materials, or greater than about 95% by weight of combustible materials, or greater than about 98% by weight of combustible materials, greater than about 99% by weight of combustible materials, or greater than about 99.9% by weight of combustible materials, or greater than about 99.99% by weight of combustible materials, or only combustible materials.

In accordance with a version of the invention, non-woven materials used in the filter pleat pack can be any of a variety of different possible material types, fiber sizes and binding material. Polyester fiber, of varying sizes, using ethyl-vinyl-chloride as a binder can be used. This polyester fiber can be randomly oriented or machine oriented, for example by being carded. Other types of fibers can be used, including bi-component fibers, such as bi-component fibers that include a polyethylene outer shell and a polyester core. Bi-component fibers can be used without binder.

In accordance with a version of the invention, adsorbents used in the filter pleat pack can, for example, be single granular material type, or mixes of different types of granular material types. For example, activated carbon mixed with ion exchange can be used. Activated carbon can be treated with a variety of different possible chemistries, each of which target different contaminants. An example of a mix ratio that can be used is 87% granular activated carbon with 13% ion exchange resin. Another mix ratio that can be used is 60% base treated granular activated carbon with 40% ion exchange.

In accordance with a version of the invention, the walls of the filter cartridge can be formed using hot melt material in molds. Other adhesives can be used. The hot melt adhesive can, for example, be a low temperature melting adhesive of a single material such as polyethylene. Other hot melt materials used can be other types of polyolefin. In accordance with a version of the invention, the material should be low out-gassing for pure air applications. The hot melt adhesive can be injected with nitrogen gas and foamed, to reduce weight and cost. Hot melt adhesive can provide the advantage of solidifying in a minimal time period. In accordance with a version of the invention, the hot melt material does not adhere to Teflon, so that the molded parts can be readily removed from molds.

In accordance with a version of the invention, the filter cartridge can include any of the materials taught in U.S. Pat. No. 6,740,147 B2 of Kishkovich et al., the entire teachings of which are hereby incorporated herein by reference; for example, in particular, the filter cartridge can include non-woven materials and adsorbents taught therein.

In accordance with a version of the invention, a side panel is used to provide enough rigidity to maintain gasket pressure along the entire perimeter of the filter. A strong, lightweight, inexpensive material may be used for the side panel, such as about 0.32 cm corrugated polypropylene panel.

Figure 7A:
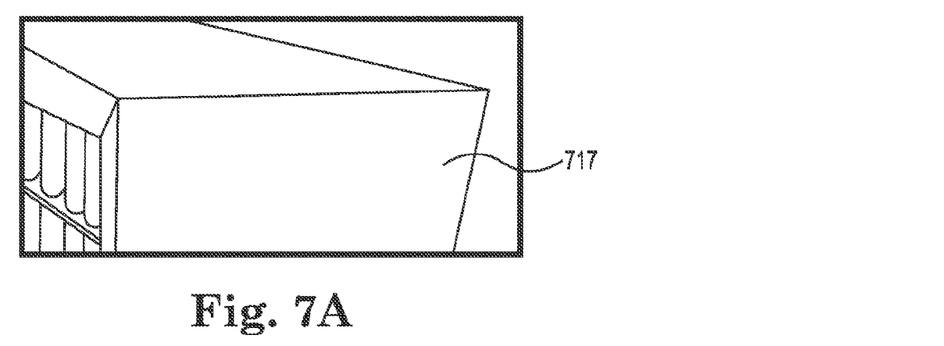
FIG. 7A-7C illustrate a side flap attaching mechanism.
Figure 7B:
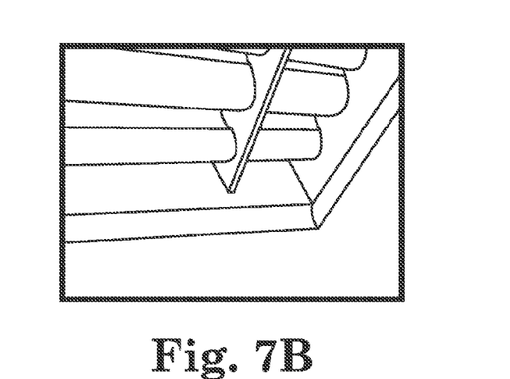
Figure 7C:
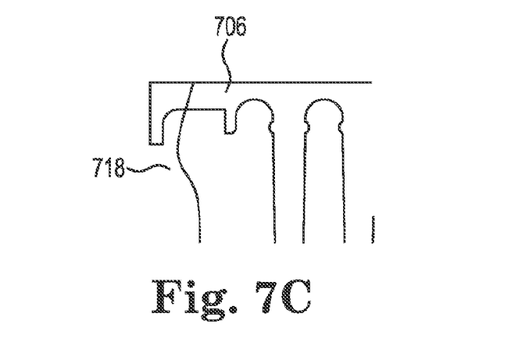

FIG. 7A illustrates a technique of attaching the side panel 717 in accordance with a version of the invention. The side panel 717 is attached while laying the bead flap. This provides clean corners, and uses no direct attachment to the glue bed. FIGS. 7B and 7C are diagrams illustrating a technique of reinforcing the side panel to accommodate lifting force, by embedding the ends of the pleat separators 706 into the bead 718, which has been found to add significant strength to the filter cartridge. In FIG. 7C, it can be seen that pleat separator combs 706 include a feature that grips the glue bead 718.

Figure 8:
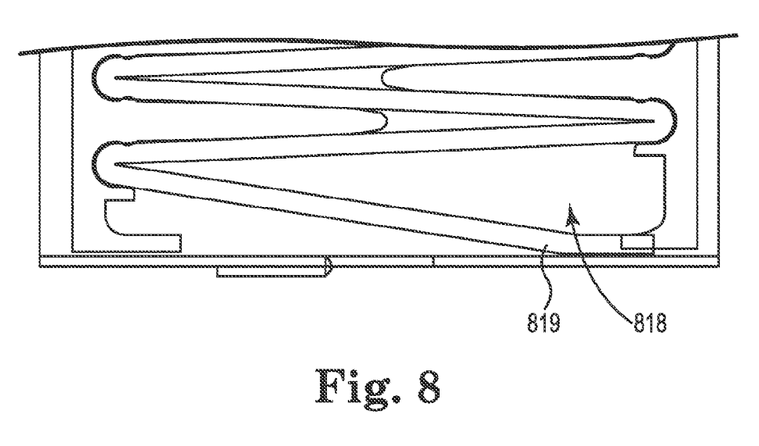
FIG. 8 is a cross-sectional view of a filter cartridge system of this disclosure.

FIG. 8 is a cross-sectional view of a filter cartridge system in accordance with a version of the invention, showing potting of the filter bead flap side combs to the side panel of the filter. Flood filling of glue 818 is used on either side of the filter bead flap 819. This permits a large glue surface area to connect to the filter, and helps to stiffen the panel and improve gasket pressure distribution. In addition, flood-filling of the filter pleat pack in a solidifying bath of hot melt, to form a four-sided seal around the filter pleat pack, can, for example, be used. In accordance with a version of the invention other techniques of forming a four-sided seal around the filter pleat pack can be used, which may, for example, include forming the four-sided seal with a single-component hot melt material, or by using a multi-component adhesive or other adhesive to form the four-sided seal.

In accordance with a version of the invention, one or more steps of molding and sealing the filter cartridge can, for example, be performed in a different order, for example by forming at least a portion of a four-sided seal prior to molding at least a portion of the filter cartridge. In one example, the filter cartridge is molded prior to forming the four-sided seal.

Figure 9:
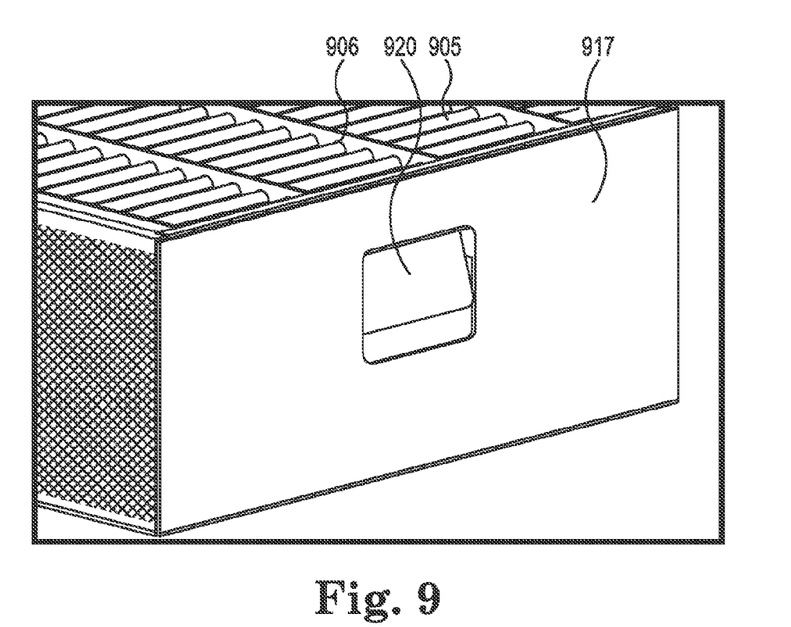
FIG. 9 is a partial perspective view of a side panel of this disclosure.

FIG. 9 is a diagram showing a handle 920 for the side panel 917 of the filter cartridge, in accordance with a version of the invention. The top-placed blind handle 920 is die cut and punched from the corrugate of the side panel 917. Such a handle provides a simple design, at low cost in high volume; with a large profile, ergonomic design. The side panel 917 is reinforced by the glue and filter pleat separator comb 906, which extends along the length of the pleat pack 905 to the side panel (not shown) on the opposite side of the filter cartridge, thereby tying the side panels 917 to the filter pleat pack and acting as a structural member for the cartridge. To manufacture the handle 920, the handle 920 can, for example, be die cut to form a flap that folds upward. The side panel 917 is placed on a potting fixture, where a steel die forces the handle into the right shape. The pleat separators 906 are glued onto the glue strips (see FIG. 3).

In accordance with a version of the invention, the filter cartridge is one that achieves superior outgas and particle discharge results for use in applications such as, for example, reduction of Airborne Molecular Contamination (AMC). For example, the filter cartridge system may be one that passes International Organization for Standardization (ISO) 14644-1 Cleanroom Standards at the Class 5, Class 4, Class 3, Class 2 or even Class 1, level for particle discharge. The entire teachings of the ISO 14644-1 Cleanroom Standards are hereby incorporated herein by reference, including particularly the particle discharge standards at the Class 1, Class 2, Class 3, Class 4 and Class 5 levels. The following table (Table 1) illustrates particle discharge requirements that may be met by the filter cartridge system:

TABLE 1

Particle Discharge Requirements by ISO Class 14644-1

| Class | ≥0.1 μm | ≥0.2 μm | ≥0.3 μm | ≥0.5 μm | ≥1 μm | ≥5 μm | FED STD 209E equivalent |
|---|---|---|---|---|---|---|---|
| ISO 1 | 10 | 2.37 | 1.02 | 0.35 | 0.083 | 0.0029 | |
| ISO 2 | 100 | 23.7 | 10.2 | 3.5 | 0.83 | 0.029 | |
| ISO 3 | 1,000 | 237 | 102 | 35 | 8.3 | 0.29 | Class 1 |
| ISO 4 | 10,000 | 2,370 | 1,020 | 352 | 83 | 2.9 | Class 10 |
| ISO 5 | 100,000 | 23,700 | 10,020 | 3,520 | 832 | 29 | Class 100 |
| ISO 6 | $1.0 \times 10^6$ | 237,000 | 102,000 | 35,200 | 8,3200 | 293 | Class 1,000 |
| ISO 7 | $1.0 \times 10^7$ | $2.37 \times 10^6$ | 1,020,000 | 352,000 | 83,200 | 2,930 | Class 10,000 |
| ISO 8 | $1.0 \times 10^8$ | $2.37 \times 10^7$ | $1.02 \times 10^7$ | 3,520,000 | 832,000 | 29,300 | Class 100,000 |
| ISO 9 | $1.0 \times 10^9$ | $2.37 \times 10^8$ | $1.02 \times 10^8$ | 35,200,000 | 8,320,000 | 293,000 | Room air |

For example, for ISO Class 5, the filter cartridge system discharges less than about 100,000 particles per cubic meter with a particle size greater than or equal to about 0.1 microns; less than about 23,700 particles per cubic meter with a particle size greater than or equal to about 0.2 microns; less than about 10,200 particles per cubic meter with a particle size greater than or equal to about 0.3 microns; less than about 3,520 particles per cubic meter with a particle size greater than or equal to about 0.5 microns; less than about 832 particles per cubic meter with a particle size greater than or equal to about 1 micron; and less than about 29 particles per cubic meter with a particle size greater than or equal to about 5 microns. For ISO Class 4, the filter cartridge system discharges less than about 10,000 particles per cubic meter with a particle size greater than or equal to about 0.1 microns; less than about 2,370 particles per cubic meter with a particle size greater than or equal to about 0.2 microns; less than about 1,020 particles per cubic meter with a particle size greater than or equal to about 0.3 microns; less than about 352 particles per cubic meter with a particle size greater than or equal to about 0.5 microns; less than about 83 particles per cubic meter with a particle size greater than or equal to about 1 micron; and less than about 2.9 particles per cubic meter with a particle size greater than or equal to about 5 microns. For ISO Class 3, the filter cartridge system discharges less than about 1,000 particles per cubic meter with a particle size greater than or equal to about 0.1 microns; less than about 237 particles per cubic meter with a particle size greater than or equal to about 0.2 microns; less than about 102 particles per cubic meter with a particle size greater than or equal to about 0.3 microns; less than about 35 particles per cubic meter with a particle size greater than or equal to about 0.5 microns; less than about 8.3 particles per cubic meter with a particle size greater than or equal to about 1 micron; and less than about 0.29 particles per cubic meter with a particle size greater than or equal to about 5 microns. Other ISO Classes may be met, in accordance with Table 1, by having the filter discharge less than about the number of particles per cubic meter that are shown in Table 1 for each class, with a particle size greater than or equal to about the particle sizes shown in columns in Table 1. In addition, the filter cartridge may reduce total airborne molecular contaminant concentrations from about 10 to about 50 ppb upstream of the filter cartridge system to less than about 1 ppb to about 5 ppb downstream of the filter cartridge system. Further, the filter cartridge may achieve a removal efficiency of at least about 90% or greater at inlet contaminant concentrations of up to about 50 ppb, such as about 99.9% or greater for specified contaminants.

Figure 10:
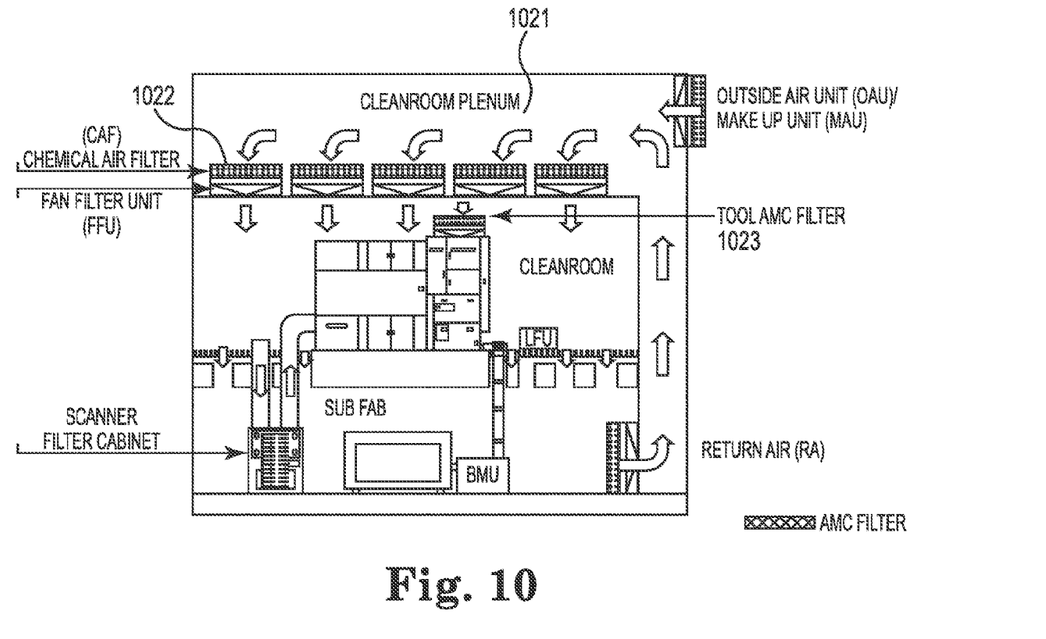
FIG. 10 is a schematic embodying the application of the AMC filter of this disclosure.

FIG. 10 is a schematic diagram illustrating contexts in which an AMC filter system in accordance with a version of the invention may be used. The filter system may be used in semiconductor manufacturing and cleanroom contexts; and may be used both in the plenum 1021, as a clean room ceiling chemical air filter 1022, and as a tool-level AMC filter 1023 on the fabrication level; and can be used for any tool (such as a baking tool, an etch tool, etc.).

In accordance with a version of the invention, one advantage that can be achieved is that no expensive injection molds need to be built. This reserves potential to use a universal mold fixture for other filter sizes and applications. Another advantage is that a durable metal housing can be re-used, thereby reducing cost. The cartridge can, if desired, be used without the re-usable metal case in less critical applications, which means that the same cartridge element can be used for both critical tool and general clean room applications. The re-usable metal housing can allow the meeting of flammability requirements, such as fire codes. Overall, the filter cartridge system can reduce costs for a user, while affecting the environment less than traditional filters.

In accordance with a version of the invention, the cartridge filter can be made out of substantially combustible materials, for example only combustible materials, and is used in conjunction with a re-usable metal housing to save cost while maintaining specifications for durability, particle discharge, aesthetics, and fire rating.

In accordance with a version of the invention, a filter element, made out of substantially combustible materials, which may be only combustible materials, is used in conjunction with a re-usable metal housing. Materials in the cartridge are plastic and substantially combustible media such as carbon and resin. This cartridge enclosure is molded using low cost hot melt glue molded in low cost open molds. In order to maintain structural integrity, plastic pleat separators are joined to the hot melt and joined to the plastic corrugated side panels. To prevent media exposure, plastic screen mesh is used as a separator that keeps media internal to hot melt adhesive. Stick-on plastic membranes may be employed for aesthetic value and to encapsulate media.

In accordance with a version of the invention, the filter cartridge is used in conjunction with a re-usable metal case, though it could be used without. The re-usable metal case assists with requirements for aesthetics, particle discharge, cost, and durability. In order to reduce cost further, media protective metal screens can be loosely assembled via a slot and flange in the metal case for easy removal.

While various compositions and methods are described, it is to be understood that this invention is not limited to the particular compositions, designs, methodologies or protocols described, as these may vary. It is also to be understood that the terminology used in the description is for the purpose of describing the particular versions or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "filter pleat pack" is a reference to one or more filter pleat packs and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the present invention has been described in considerable detail with reference to certain versions thereof, other versions are possible. Therefore the spirit and scope of the appended claims should not be limited to the description and the versions contained within this specification.

The teachings of all patents, published applications and references cited herein are incorporated by reference in their entirety.

What is claimed is:

1. A filter cartridge system for control of airborne molecular contamination, the filter cartridge system comprising:
a filter cartridge comprising a non-woven fiber and at least one adsorbent, the filter cartridge comprising substantially combustible materials, wherein the filter cartridge comprises a filter pleat pack potted at opposite ends in a single-component hot melt material and at least one plastic pleat separator embedded in the hot melt material; and
a reusable case for the filter cartridge, the filter cartridge being readily separable from the reusable case for disposal.

2. The filter cartridge system of claim 1, wherein the filter cartridge comprises only combustible materials.

3. The filter cartridge system of claim 1, wherein the filter pleat pack comprises the non-woven fiber, the filter pleat pack having an edge seal along pleat edges of the filter pleat pack.

4. The filter cartridge system of claim 1, wherein the filter pleat pack has a four-sided seal formed by solidification of the single-component hot melt material.

5. The filter cartridge system of claim 1, wherein the filter cartridge comprises a mixed adsorbent media.

6. The filter cartridge system of claim 1, wherein the plastic pleat separator comprises a grip feature, and wherein the grip feature is embedded in the hot melt material.

7. The filter cartridge system of claim 1, wherein the filter cartridge further comprises a plastic side panel.

8. The filter cartridge system of claim 1, wherein the filter cartridge further comprises at least one of a carbon filter medium and an ion exchange filter medium.

9. The filter cartridge system of claim 1, wherein the case is metal and optionally comprises an anodized aluminum case.

10. The filter cartridge system of claim 1, wherein the filter cartridge system comprises a particle discharge according to the International Organization for Standardization (ISO) 14644-1 Cleanroom Standards of one of Class 5, Class 4, Class 3, Class 2 or Class 1.

11. The filter cartridge system of claim 1, wherein the filter cartridge system reduces total airborne molecular contaminant concentrations from about 10 to about 50 ppb upstream of the filter cartridge system to less than about 1 ppb to about 5 ppb downstream of the filter cartridge system.

12. The filter cartridge system of claim 1, wherein the filter cartridge system achieves a removal efficiency of at least about 90% or greater at inlet contaminant concentrations of up to about 50 ppb.

* * * * *